(12) United States Patent
Wu et al.

(10) Patent No.: US 10,750,065 B2
(45) Date of Patent: Aug. 18, 2020

(54) MINIATURIZED OPTICAL SYSTEM WITH STABILIZATION

(71) Applicant: TDK TAIWAN CORP., Taoyuan (TW)

(72) Inventors: Fu-Yuan Wu, Taoyuan (TW);
Kuo-Chun Kao, Taoyuan (TW);
Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 7 days.

(21) Appl. No.: 16/033,316

(22) Filed: Jul. 12, 2018

(65) Prior Publication Data

US 2019/0020796 A1 Jan. 17, 2019

Related U.S. Application Data

(60) Provisional application No. 62/532,117, filed on Jul. 13, 2017.

(30) Foreign Application Priority Data

Jun. 13, 2018 (CN) .......................... 2018 1 0606424

(51) Int. Cl.
| | |
|---|---|
| *H04N 5/228* | (2006.01) |
| *H04N 5/225* | (2006.01) |
| *G03B 13/36* | (2006.01) |
| *H04N 5/232* | (2006.01) |
| *G03B 3/10* | (2006.01) |
| *G03B 5/04* | (2006.01) |

(52) U.S. Cl.
CPC ............. *H04N 5/2254* (2013.01); *G03B 3/10* (2013.01); *G03B 5/04* (2013.01); *G03B 13/36* (2013.01); *H04N 5/2253* (2013.01); *H04N 5/2257* (2013.01); *H04N 5/23248* (2013.01); *G03B 2205/0015* (2013.01); *G03B 2205/0069* (2013.01)

(58) Field of Classification Search
CPC .................................................... H04N 5/2254
See application file for complete search history.

(56) References Cited

U.S. PATENT DOCUMENTS

| | | | |
|---|---|---|---|
| 7,692,689 B2* | 4/2010 | Teramoto | H04N 5/2251 348/208.7 |
| 9,915,828 B2* | 3/2018 | Sul | G02B 27/646 |

(Continued)

*Primary Examiner* — Gary C Vieaux
(74) *Attorney, Agent, or Firm* — Muncy, Geissler, Olds & Lowe, P.C.

(57) ABSTRACT

An optical system is provided and includes a fixed module, a movable module, a driving assembly and a plurality of sliding members. The fixed module includes a base. The movable module includes an optical member holder and a driving frame unit. The optical member holder is configured to hold an optical member, and the driving frame unit is connected to the optical member holder. The driving assembly includes at least one first magnetic element and at least one second magnetic element. The second magnetic element corresponds to the first magnetic element and is configured to drive the driving frame unit with the optical member holder to move relative to the base. The sliding members are securely disposed on the fixed module or the movable module, so that the movable module is able to slide relative to the fixed module.

14 Claims, 10 Drawing Sheets

(56) References Cited

U.S. PATENT DOCUMENTS

| | | | | |
|---|---|---|---|---|
| 2010/0149668 A1* | 6/2010 | Wade | ............... | G02B 7/08 |
| | | | | 359/824 |
| 2011/0269317 A1* | 11/2011 | Knoedgen | ............... | H01R 41/00 |
| | | | | 439/32 |
| 2015/0226978 A1* | 8/2015 | Sugawara | ............... | G02B 7/08 |
| | | | | 359/557 |
| 2016/0209671 A1* | 7/2016 | Hee | ............... | G02B 27/646 |

* cited by examiner

MINIATURIZED OPTICAL SYSTEM WITH STABILIZATION

CROSS REFERENCE TO RELATED APPLICATIONS

This application claims the benefit of U.S. Provisional Application No. 62/532,117, filed Jul. 13, 2017, and China Patent Application No. 201810606424.0, filed Jun. 13, 2018, the entirety of which are incorporated by reference herein.

BACKGROUND OF THE DISCLOSURE

Field of the Disclosure

The present disclosure relates to an optical system, and more particularly to an optical system that has a function of optical image stabilization.

Description of the Related Art

As technology has progressed, many kinds of electronic devices such as tablet computers and smartphones have begun to include the functionality of digital photography or video recording. A user can operate the electronic device to capture various images through an optical system (such as a camera module) included in the electronic device, and therefore electronic devices equipped with camera modules have gradually become popular.

In general, the camera module has the functions of auto focusing and optical image stabilization (OIS). The camera module can include an optical member holder, a plurality of elastic members and a base, and the optical member holder is moved by the elastic members relative to the base, for example, along the XY plane. When the camera module is shaken, the driving assembly in the camera module will drive the optical member holder to move in the opposite direction, so as to achieve the purpose of anti-shake. However, when the thickness of the camera module needs to be reduced for the purpose of miniaturization, the elastic member may easily become damaged because its length is too short.

Therefore, how to design the structure of the camera module to reduce the thickness of the camera module and to perform the function of optical image stabilization at the same time is a topic nowadays that needs to be discussed and solved.

BRIEF SUMMARY OF THE DISCLOSURE

Accordingly, one objective of the present disclosure is to provide an optical system to solve the above problems.

According to some embodiments of the disclosure, an optical system is provided and includes a fixed module, a movable module, a driving assembly and a plurality of sliding members. The fixed module includes a base. The movable module includes an optical member holder and a driving frame unit. The optical member holder is configured to hold an optical member, and the driving frame unit is connected to the optical member holder. The driving assembly includes at least one first magnetic element and at least one second magnetic element. The second magnetic element corresponds to the first magnetic element and is configured to drive the driving frame unit with the optical member holder to move relative to the base. The sliding members are securely disposed on the fixed module or the movable module, so that the movable module is able to slide relative to the fixed module.

According to some embodiments, the optical system further includes a circuit unit disposed on the fixed module. At least two of the sliding members are in contact with the circuit unit. According to some embodiments, the driving assembly further includes a driving coil disposed on the optical member holder, and the driving coil is electrically connected to the circuit unit through the sliding members. According to some embodiments, the movable module further includes an elastic member configured to connect the optical member holder and the driving frame unit. The sliding member includes a protruding portion disposed on the elastic member. According to some embodiments, the protruding portion includes a hemispherical structure.

According to some embodiments, the circuit unit includes a plurality of electrical contacts corresponding to the sliding members, a plane is defined by the electrical contacts, and the plane is perpendicular to an optical axis of the optical member. According to some embodiments, a size of each of the electrical contacts is greater than a sliding range of the corresponding sliding member.

According to some embodiments, the fixed module further includes a casing, and the driving frame unit includes an outer moving frame which is movable along a first direction relative to the casing. According to some embodiments, the driving frame unit further includes an inner moving frame which is movable along a second direction relative to the outer moving frame. The first direction is different from the second direction. According to some embodiments, the sliding members are respectively disposed on a first side of the outer moving frame and a second side of the inner moving frame, and the first side is not parallel to the second side. According to some embodiments, the optical system further includes a circuit unit disposed on the fixed module, the driving assembly further includes a driving coil, and the movable module further includes an elastic member. The circuit unit is electrically connected to the driving coil through the casing, the sliding members, the outer moving frame, the inner moving frame and the elastic member.

According to some embodiments, the movable module further includes an elastic member configured to connect the optical member holder and the driving frame unit, the sliding member is disposed on the elastic member, and a groove is formed on the elastic member and is disposed on an opposite side of the sliding member. In addition, a protruding portion corresponding to the groove is formed on the inner moving frame, and the protruding portion is configured to engage with the groove.

According to some embodiments, the movable module, the sliding members and the base are arranged in sequence along an optical axis of the optical member.

According to some embodiments, the driving assembly includes a plurality of first magnetic elements disposed on the driving frame unit, and sizes of two adjacent magnetic elements are different. According to some embodiments, the two adjacent first magnetic elements are not equal in height along the optical axis of the optical member.

According to some embodiments, the fixed module further includes a magnetic conductivity element, the first magnetic element is disposed on the driving frame unit, and the first magnetic element is configured to act with the magnetic conductivity element to generate a magnetic attraction force.

The present disclosure provides an optical system including an optical member holder, a driving frame unit, a driving assembly and a base. The driving assembly can generate an electromagnetic driving force to drive the driving frame unit with the optical member holder to move relative to the base. In some embodiments, the driving frame unit can include an outer moving frame and an inner moving frame. The inner moving frame can drive the optical member holder to move relative to the outer moving frame along a second direction, and the outer moving frame can drive the inner moving frame and the optical member holder to move along a first direction.

Based on the structural design of embodiments of the present disclosure, a plurality of elastic members for connecting the upper spring sheet and the fixed module can be omitted, and the problem that the length of the elastic member is too short to be easily damaged can be avoided. Therefore, the optical system of the present disclosure not only can reduce the manufacturing cost, but also can reduce the size of the optical system, so as to achieve purpose of miniaturization.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

DETAILED DESCRIPTION OF THE ILLUSTRATIVE EMBODIMENTS

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean+/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 1:
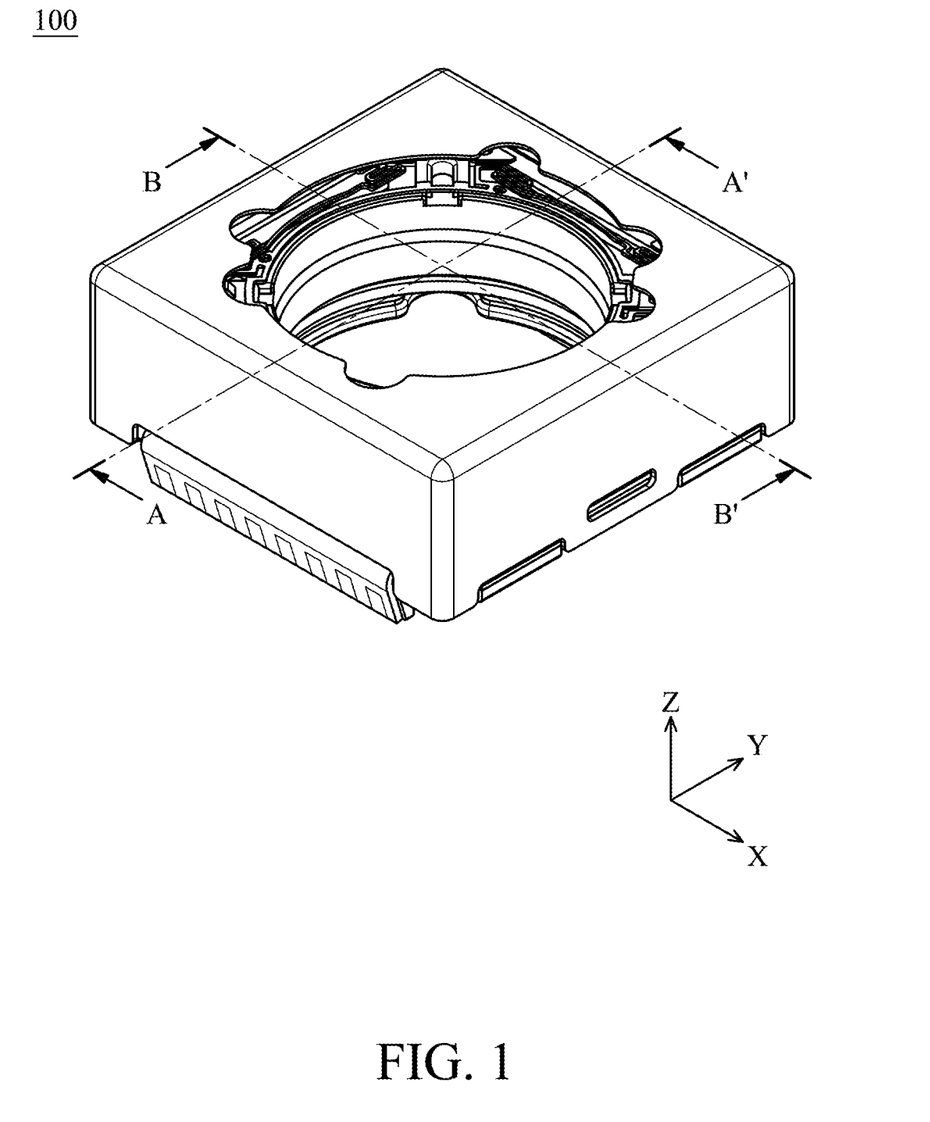
FIG. 1 shows a schematic diagram of an optical system according to an embodiment of the present disclosure.
Figure 2:
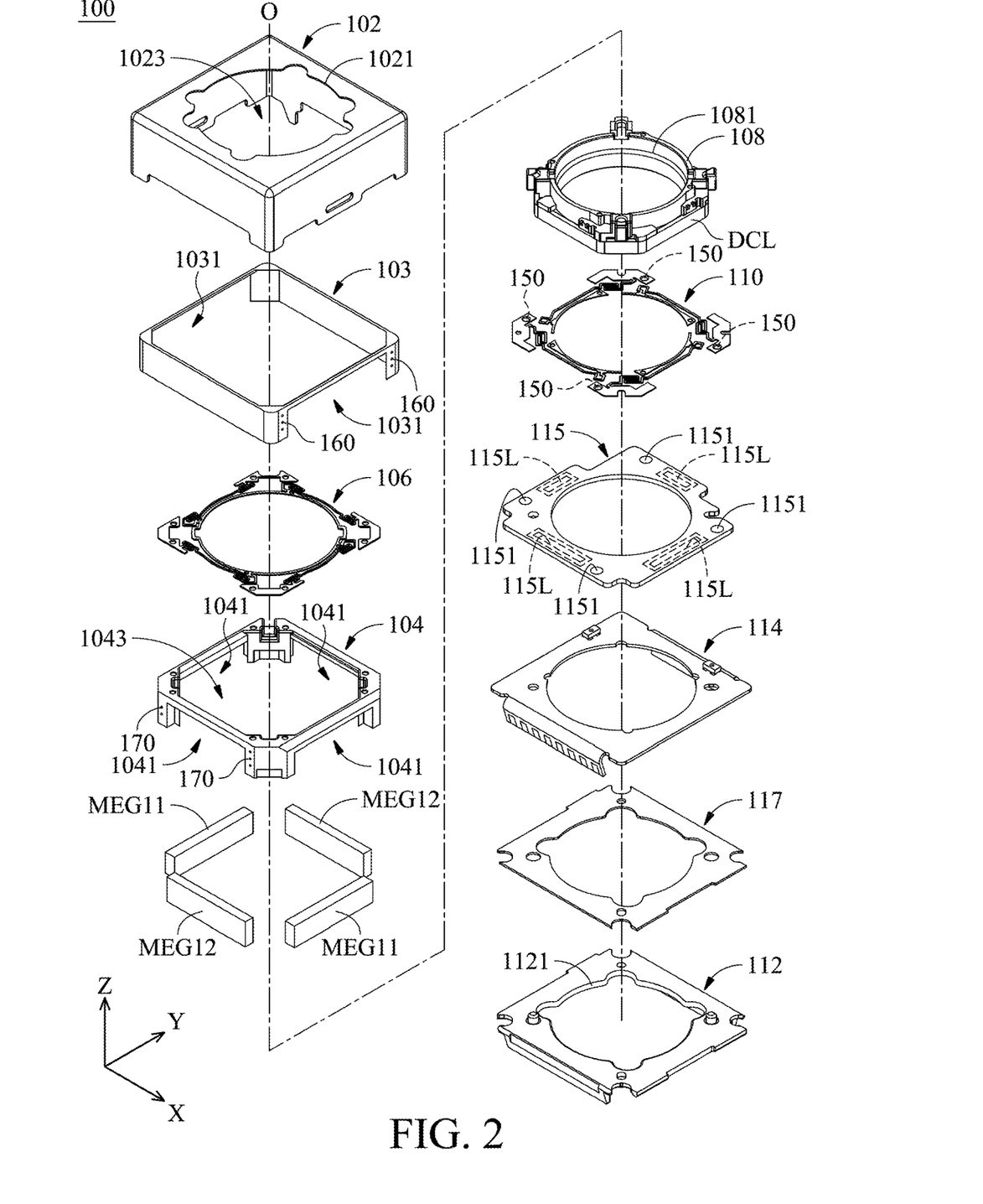
FIG. 2 shows an exploded diagram of the optical system according to the embodiment of the present disclosure.
Figure 3:
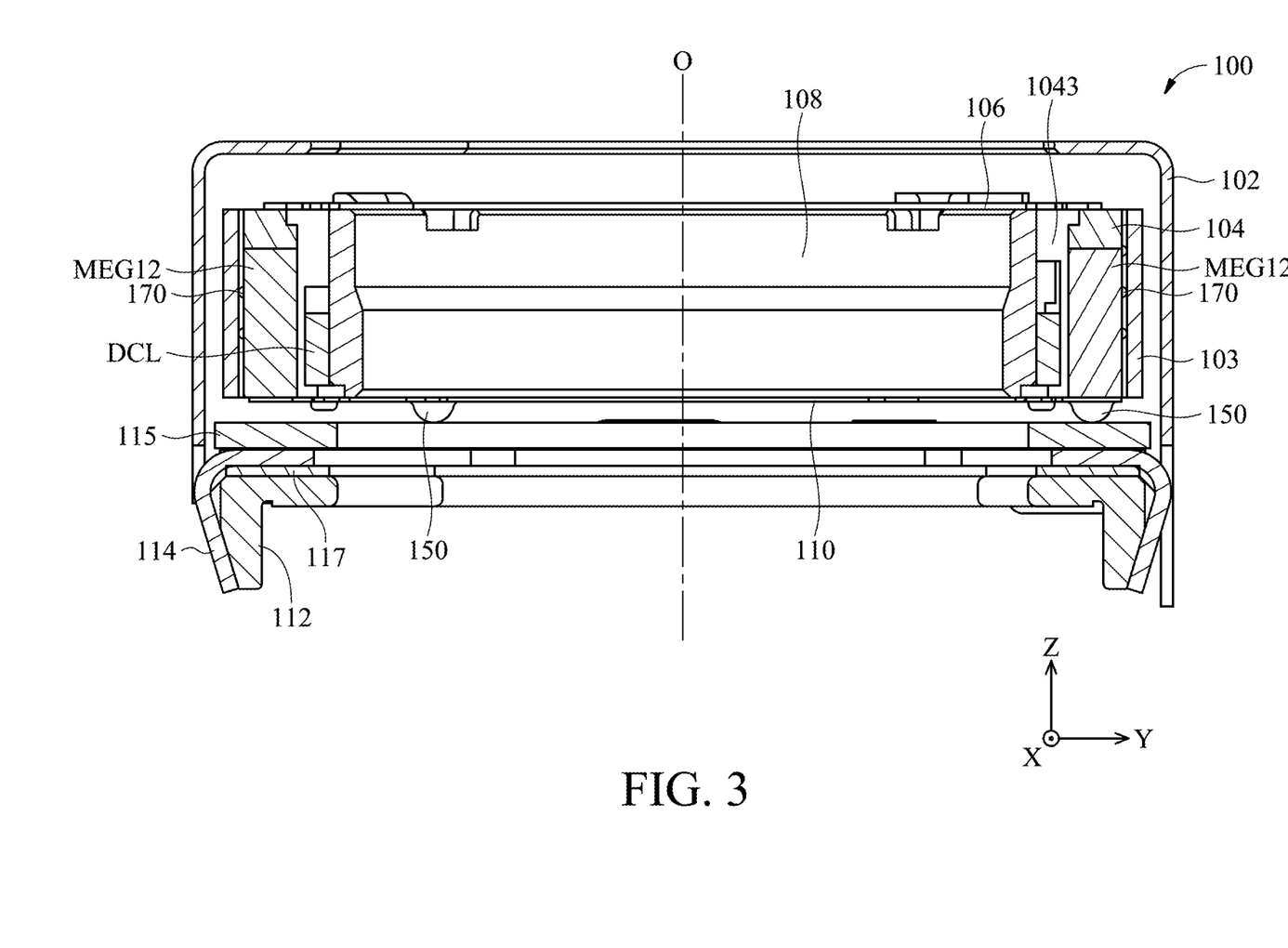
FIG. 3 shows a cross-sectional view along line A-A' in FIG. 1 according to the embodiment of the present disclosure.

Please refer to FIG. 1 to FIG. 3. FIG. 1 shows a schematic diagram of an optical system 100 according to an embodiment of the present disclosure, FIG. 2 shows an exploded diagram of the optical system 100 according to the embodiment of the present disclosure, and FIG. 3 shows a cross-sectional view along line A-A' in FIG. 1 according to the embodiment of the present disclosure. The optical system 100 can be a camera system with an optical driving assembly and can be configured to hold an optical member (not shown in the figures). The optical system 100 can be installed in different electronic devices or portable electronic devices, such as a smartphone or a tablet computer, for allowing a user to perform the image capturing function. In this embodiment, the optical driving assembly can be a voice coil motor (VCM) with an auto-focusing (AF) function, but it is not limited thereto. In some embodiments, the optical driving assembly of the optical system 100 can also perform the functions of auto-focusing and optical image stabilization (OIS).

Please continue to refer to FIG. 2, which shows an exploded diagram of the optical system 100 according to the embodiment of the disclosure. The optical system 100 includes a casing 102, a driving frame unit (including an outer moving frame 103 and an inner moving frame 104), an upper spring sheet 106, an optical member holder 108, two first magnetic elements MEG11, two first magnetic elements MEG12, a driving coil DCL, a lower spring sheet 110, a base 112, a circuit unit (including a circuit board 114 and a plate coil 115) and a magnetic conductivity element 117. In this embodiment, a fixed module of the optical system 100 can be defined to include the base 112 and the casing 102, and the base 112 is securely connected to the casing 102. The method for connecting the base 112 and the casing 102 can be rivet joint, engagement or welding, but it is not limited thereto. Any method that is capable of connecting the base 112 to the casing 102 is within the scope of the present disclosure. Moreover, the fixed module can include other members in other embodiments, such as the magnetic conductivity element 117. In addition, the optical member holder 108, the outer moving frame 103 and the inner moving frame 104 can collectively form a movable module, and the movable module can move relative to the fixed module. Furthermore, the movable module can also include the upper spring sheet 106 and the lower spring sheet 110.

The casing 102 has a hollow structure, and a casing opening 1021 is formed on the casing 102. A base opening 1121 is formed on the base 112. The center of the casing opening 1021 corresponds to an optical axis O of an optical member (not shown in the figures) which is held by the optical member holder 108. The base opening 1121 corresponds to an image sensing element (now shown in the figures) disposed below the base 112. The casing 102 can include an accommodating space 1023 for accommodating the outer moving frame 103, the inner moving frame 104, the upper spring sheet 106, the optical member holder 108, the first magnetic elements MEG11 and MEG12, the driving coil DCL and the low spring sheet 110. Furthermore, the casing 102 can also accommodate the circuit board 114, the plate coil 115, the magnetic conductivity element 117 and the base 112.

As shown in FIG. 2, the outer moving frame 103 has two side openings 1031, and the inner moving frame 104 can have a plurality of grooves 1041 and a central opening 1043. In this embodiment, the inner moving frame 104 is accommodated in the outer moving frame 103, and the inner moving frame 104 can have four grooves 1041 for accommodating the first magnetic elements MEG11 and the first magnetic elements MEG12, but the number of grooves 1041 and the first magnetic elements is not limited to this embodiment. In this embodiment, the shape of the first magnetic element can include a long strip-shaped structure, but it is not limited thereto. For example, the first magnetic elements can have different shapes in other embodiments.

As shown in FIG. 2, the optical member holder 108 has a hollow ring structure, and the optical member holder 108 has a through hole 1081. The through hole 1081 forms a threaded structure (not shown) corresponding to another threaded structure (not shown) on the optical member, so that the optical member can be locked in the through hole 1081. In this embodiment, the driving coil DCL is disposed on and surrounds the optical member holder 108. The optical member holder 108 and the aforementioned optical member are disposed in the central opening 1043 and can move relative to the inner moving frame 104. More specifically, as shown in FIG. 3, the optical member holder 108 is connected to the inner moving frame 104 by the upper spring sheet 106 and the lower spring sheet 110, so that the optical member holder 108 is suspended in the central opening 1043.

When the driving coil DCL is provided with electricity, the first magnetic elements MEG11 and the first magnetic elements MEG12 act with the driving coil DCL to generate an electromagnetic driving force, to drive the optical member holder 108 to move relative to the circuit board 114 and the base 112 along the optical axis O (the Z-axis direction), so that the auto focusing function is performed. In some embodiments, the first magnetic elements MEG11 and the first magnetic elements MEG12 can include at least one multipole magnet which is used to electromagnetically act with the corresponding driving coil DCL to drive optical member holder 108 to move along the optical axis O, so as to perform an auto focusing function.

It should be noted that the upper spring sheet 106 or the low spring sheet 110 can be an elastic member. In this embodiment, the upper spring sheet 106 can be integrally formed in one piece, and the lower spring sheet 110 can consist of four detachable spring sheets, but they are not limited thereto. In addition, it should be noted that, as shown in FIG. 2 and FIG. 3, the inner portions of the upper spring sheet 106 and the inner portions of the lower spring sheet 110 are securely connected to the optical member holder 108, and the outer portions of the upper spring sheet 106 and the lower spring sheet 110 are securely connected to the inner moving frame 104. Therefore, the optical member holder 108 can be suspended in the central opening 1043 by the upper spring sheet 106 and the lower spring sheet 110.

In addition, the optical system 100 can include a plurality of sliding members disposed on the movable module or the fixed module. For example, as shown in FIG. 2 and FIG. 3, there are four sliding members 150 disposed on the outer portion of the lower spring sheet 110. In this embodiment, the sliding member 150 is a protruding portion. As shown in FIG. 3, the sliding member 150 can include a hemispherical structure, and the sliding members 150 and the lower spring sheet 110 are integrally formed in one piece, but they are not limited to this embodiment. In addition, the plate coil 115 of the circuit unit can correspondingly include a plurality of electrical contacts 1151 corresponding to the plurality of sliding members 150. In this embodiment, a plane can be defined by the electrical contacts 1151, and the plane is perpendicular to the optical axis O of the optical member. In this embodiment, the plate coil 115 includes four electrical contacts 1151, and the four sliding members 150 of the lower spring sheet 110 are respectively in contact with the four electrical contacts 1151 so that the lower spring sheet 110 is electrically connected to the plate coil 115.

In addition, in this embodiment, the driving coil DCL can be electrically connected to the lower spring sheet 110, so that the driving coil DCL can be electrically connected to the plate coil 115 via the sliding members 150 on the lower spring sheet 110. It should be noted that because the driving coil DCL has a positive terminal and a negative terminal, at least two sliding members 150 are required to contact the two electrical contacts 1151 on the plate coil 115 so that the driving coil DCL can operate normally when the driving coil DCL is electrically connected to the circuit unit.

In this embodiment, the circuit board 114 can be a flexible printed circuit (FPC) board, the plate coil 115 is disposed on the circuit board 114 and is electrically connected to the circuit board 114. In this embodiment, the in the plate coil 115 can include four second magnetic elements 115L (the coils) corresponding to the first magnetic elements MEG11 and the first magnetic elements MEG12, and the second magnetic elements 115L, the first magnetic elements MEG11 and the first magnetic elements MEG12 can be defined as a driving assembly. In this embodiment, the second magnetic elements 115L are electrically connected to the circuit board 114. For example, there are electrical contacts disposed on the plate coil 115 to be directly in contact with the conducting wires of the circuit board 114. When the second magnetic elements 115L in the plate coil 115 are supplied with electricity, the second magnetic elements 115L act with the first magnetic elements MEG11 and the first magnetic elements MEG12 to generate an electromagnetic driving force, so as to drive the driving frame unit (the outer moving frame 103 and the inner moving frame 104) with the optical member holder 108 to move along the X-Y plane relative to the fixed module (such as the plate coil 115, the circuit board 114 and the base 112). As a result, when the optical system 100 is shaken, the optical member holder 108 can be driven by the electromagnetic driving force to move along the X-Y plane, so as to compensate for the movement due to the shake of the optical system 100, and the purpose of optical image stabilization (OIS) can be achieved.

In addition, as shown in FIG. 2 and FIG. 3, the magnetic conductivity element 117 can be a plate body which is disposed on the base 112, and the circuit board 114 is disposed on the magnetic conductivity element 117. In this embodiment, as shown in FIG. 3, the first magnetic elements MEG11 and the first magnetic elements MEG12 (only the first magnetic elements MEG12 are shown in FIG. 3) disposed on the inner moving frame 104 and the magnetic conductivity element 117 can generate a magnetic attraction force. This magnetic attraction force can attract the inner moving frame 104 so that the inner moving frame 104 can be more stably in contact with the plate coil 115 by the sliding members 150. That is, the sliding members 150 are not easily separated from the plate coil 115.

In addition, as shown in FIG. 3, the movable module (including the outer moving frame 103, the inner moving frame 104 and the optical member holder 108), the sliding members 150, the plate coil 115, the circuit board 114 and the base 112 are arranged along the optical axis O in sequence. That is, they are arranged along the Z-axis direction.

In other embodiments of the present disclosure, the plate coil 115, the circuit board 114, the magnetic conductivity element 117 and the base 112 can be integrated into an integrally-formed base body. For example, the base body can be made of metal material, an insulating layer can be formed on the base body, and a plurality of electrical wirings can be further formed on the insulating layer. For example, the electrical wirings can include the aforementioned second magnetic elements 115L and the conducting wirings of the circuit board 114. Based on this structural design, the height of the optical system along the Z axis direction can be further reduced, so as to achieve the purpose of miniaturization.

Figure 4A:
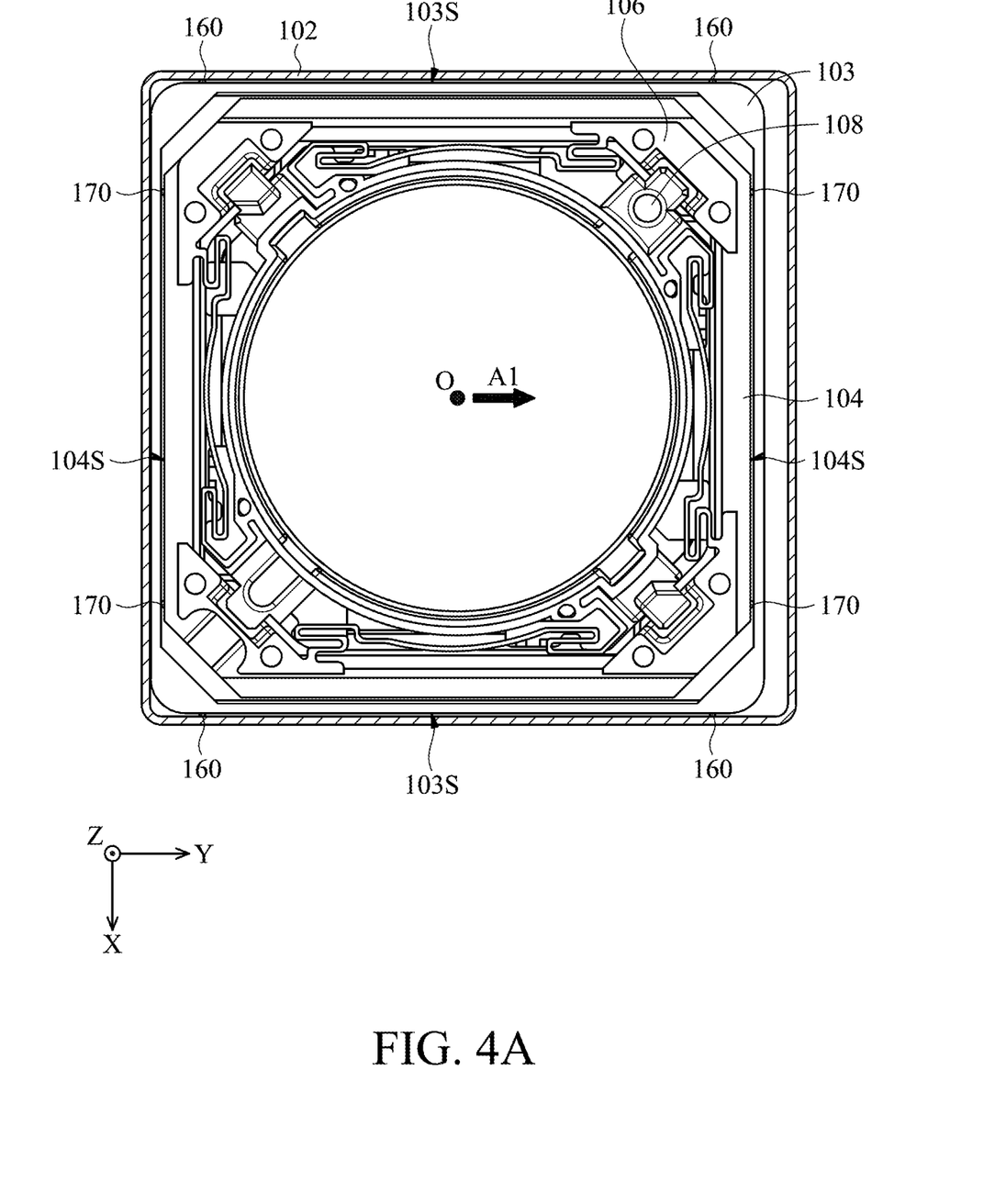
FIG. 4A and FIG. 4B are diagrams illustrating that the driving frame unit drives optical member holder to move along the Y-axis direction according to the embodiment of the present disclosure.
Figure 4B:
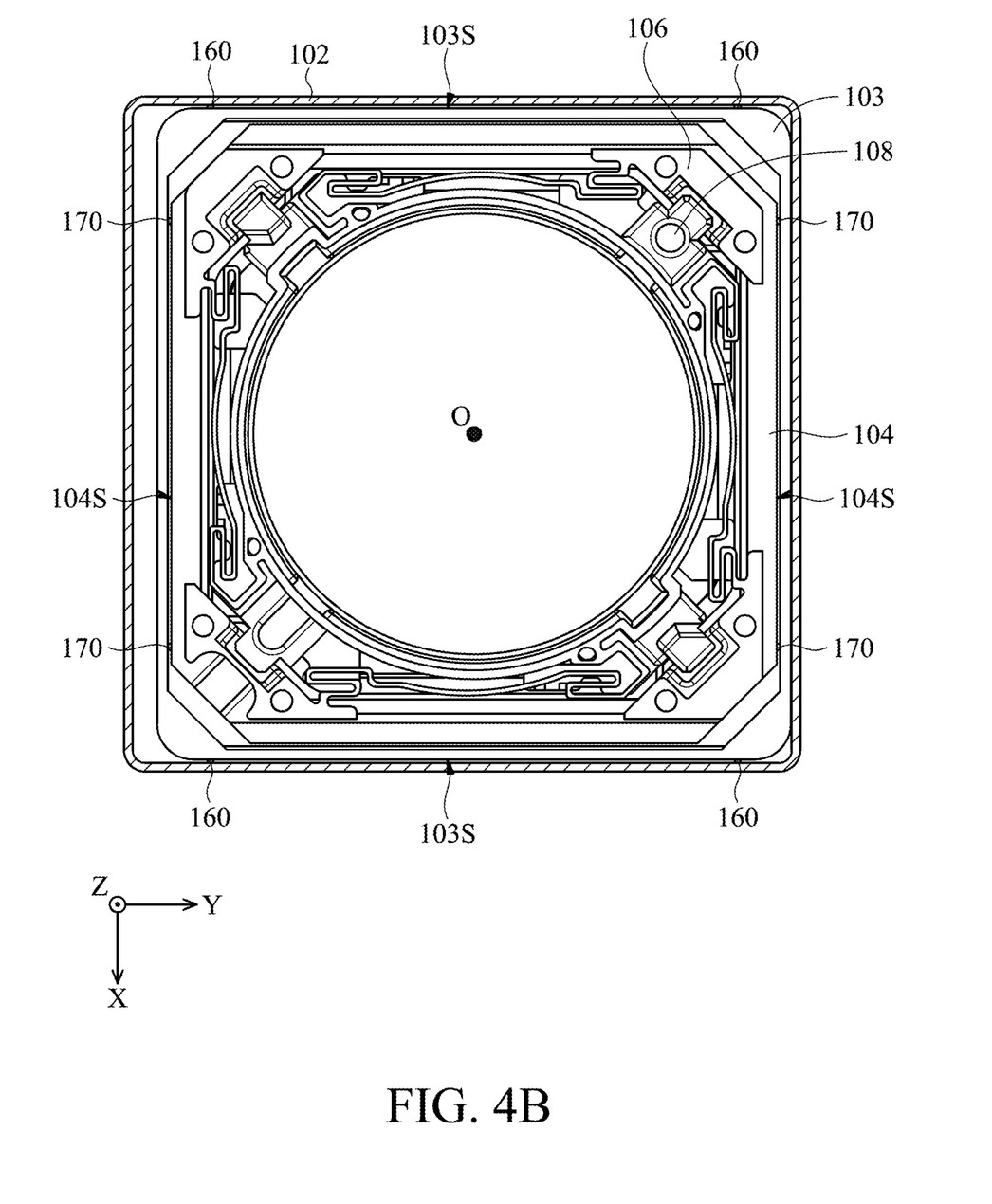

Referring to FIG. 2, FIG. 4A and FIG. 4B. FIG. 4A and FIG. 4B are diagrams illustrating that the driving frame unit drives optical member holder 108 to move along the Y-axis direction according to the embodiment of the present disclosure. As shown in FIG. 2 and FIG. 4A, the optical system 100 can further include a plurality of sliding members 160 disposed on two first sides 103S of the outer moving frame 103, and the outer moving frame 103 is in contact with the inner wall surface of the casing 102 along the X-axis direction through the plurality of sliding members 160. That is, the outer moving frame 103 cannot move along the X-axis direction relative to the casing 102. Furthermore, the optical system 100 can further include a plurality of sliding members 170 disposed on the two second sides 104S of the inner moving frame 104, and the inner moving frame 104 is in contact with the inner wall surface of the outer moving frame 103 along the Y-axis direction through the sliding members 170. That is, the inner moving frame 104 cannot move along the Y-axis direction relative to the outer moving frame 103. In this embodiment, the first side 103S is not parallel to the second side 104S. Specifically, the first side 103S is substantially perpendicular to the second side 104S.

When the two first magnetic elements MEG12 act with the corresponding second magnetic elements 115L to generate an electromagnetic driving force, the electromagnetic driving force drives the outer moving frame 103 to move along a first direction A1 (the Y-axis direction) relative to the casing 102. Thus, the outer moving frame 103 also drives the inner moving frame 104 and the optical member holder 108 to move together along the first direction A1 (the Y-axis direction). For example, the electromagnetic driving force can drive the outer moving frame 103, the inner moving frame 104, and the optical member holder 108 to move from the position in FIG. 4A to the position in FIG. 4B.

Figure 5A:
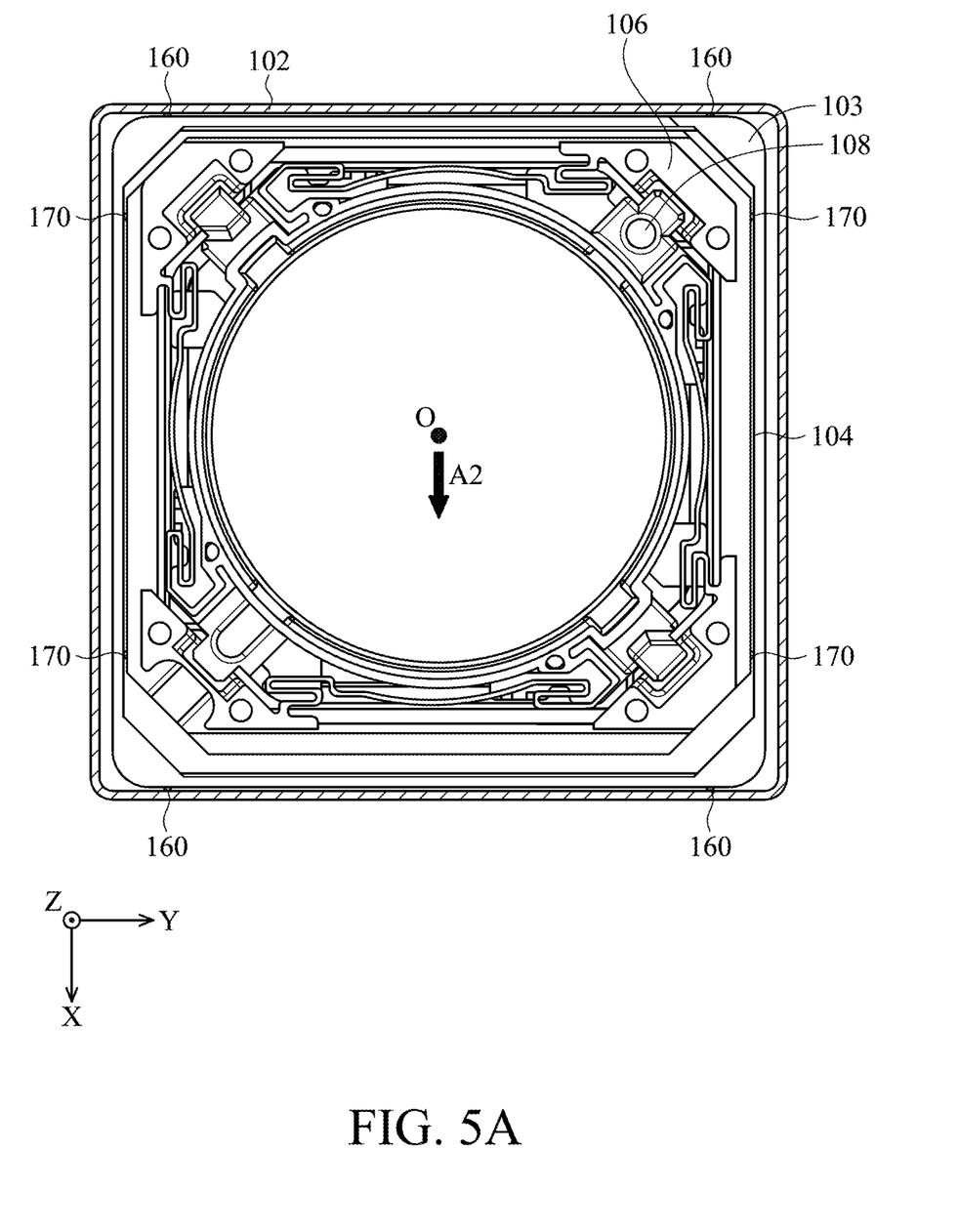
FIG. 5A and FIG. 5B are diagrams illustrating that the driving frame unit drives the optical member holder to move along the X-axis direction according to the embodiment of the present disclosure.
Figure 5B:
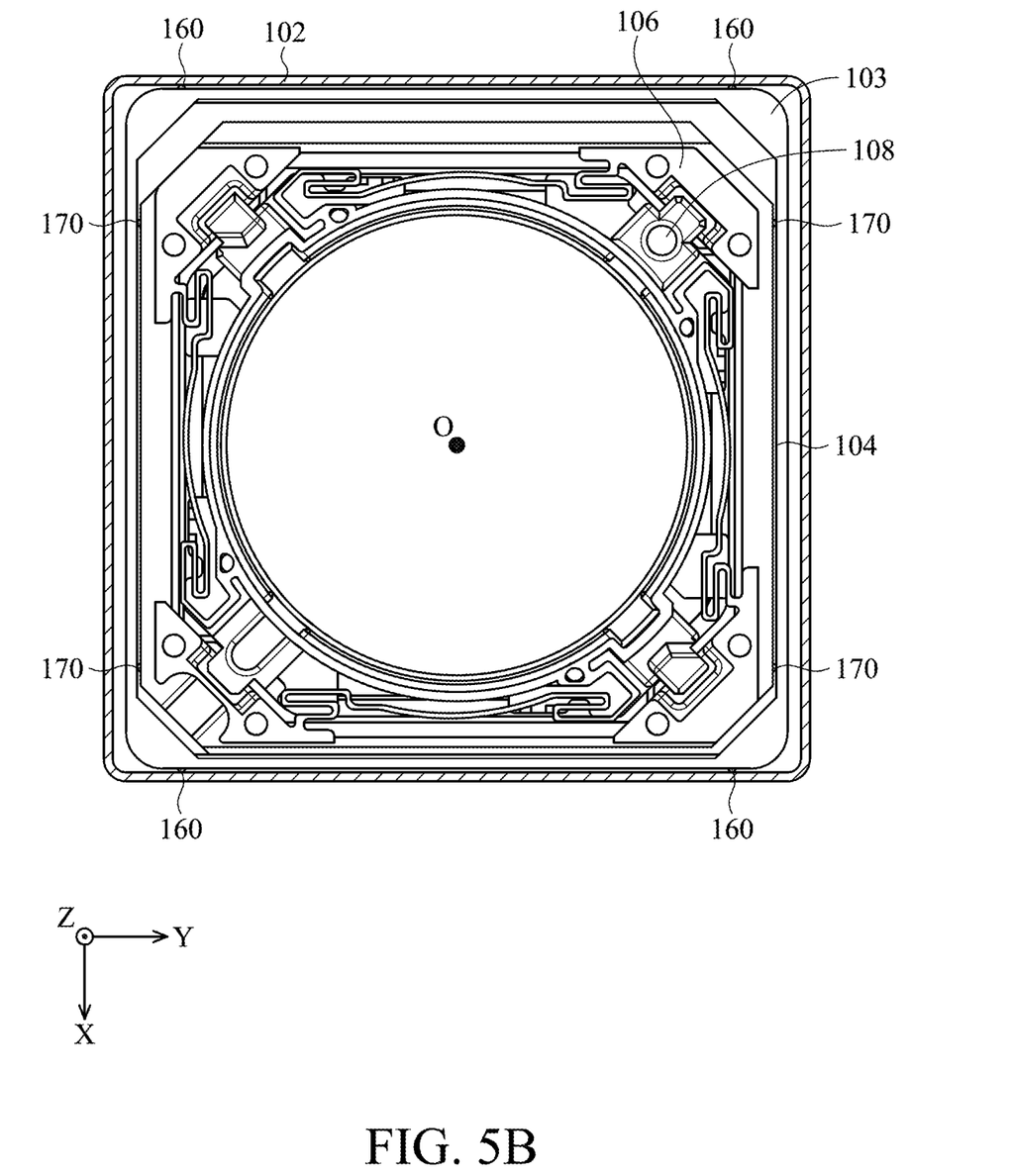

Referring to FIG. 2, FIG. 5A and FIG. 5B. FIG. 5A and FIG. 5B are diagrams illustrating that the driving frame unit drives the optical member holder 108 to move along the X-axis direction according to the embodiment of the present disclosure. Similarly, when the two first magnetic elements MEG11 act with the corresponding second magnetic elements 115L to generate an electromagnetic driving force, the electromagnetic driving force drives the inner moving frame 104 to move along a second direction A2 (the X-axis direction) relative to the outer moving frame 103. Thus, the inner moving frame 104 also drives the optical member holder 108 to move along the second direction A2 (the X-axis direction). For example, the electromagnetic driving force can drive the inner moving frame 104 and the optical member holder 108 to move from the position in FIG. 5A (the uppermost position) to the position in FIG. 5B (the lowermost position). In this embodiment, the first direction A1 is different from the second direction A2. Specifically, the first direction A1 is substantially perpendicular to the second direction A2, the second direction A2 is substantially perpendicular to the optical axis O, and the first direction A1 and the second direction A2 cross the optical axis O.

It should be noted that, in this embodiment, the sliding members 160 and the sliding members 170 can have a hemispherical structure, but it is not limited to this embodiment. The sliding members 160 are fixedly disposed on the outer moving frame 103, and the sliding members 170 are fixedly disposed on the inner moving frame 104. For example, the sliding members 160 and the outer moving frame 103 can be integrally formed, and the sliding member 170 and the inner moving frame 104 can be integrally formed. That is, the sliding members 160 do not roll relative to the casing 102 or the outer moving frame 103, and the sliding members 170 do not roll relative to the inner moving frame 104 or the outer moving frame 103. In some embodiments, the sliding members 160 and the sliding members 170 can be made of metal material, the inner wall surface of casing 102 contacting the sliding members 160 can also be made of metal material, and the inner wall surface of the outer moving frame 103 contacting the sliding members 170 can also be made of metal material. Based on this design, particles resulting from friction can be reduced, so as to prevent the particles from affecting the imaging result of the optical system 100.

When the sliding members 160 and the sliding members 170 are made of a metal material, one or more wires can also be formed on the inner wall surface of the casing 102 by molded interconnected device (MID) technology, so that the circuit board 114 can be electrically connected to the driving coil DCL through these wires, the sliding members 160 which contact the wires, the outer moving frame 103, the sliding members 170, the inner moving frame 104 and the upper spring sheet 106. Based on this design, the height of the optical system 100 along the Z-axis direction can be further reduced, so as to achieve the purpose of miniaturization.

In addition, in other embodiments, the movement of the outer moving frame 103 and the inner moving frame 104 can also be implemented by other means. For example, tracks or balls can be disposed between the casing 102 and the outer moving frame 103 or between the outer moving frame 103 and the inner moving frame 104, but it is not limited thereto. Any way of driving the driving frame unit to move along the X-Y plane is within the scope of the present disclosure.

Figure 6:
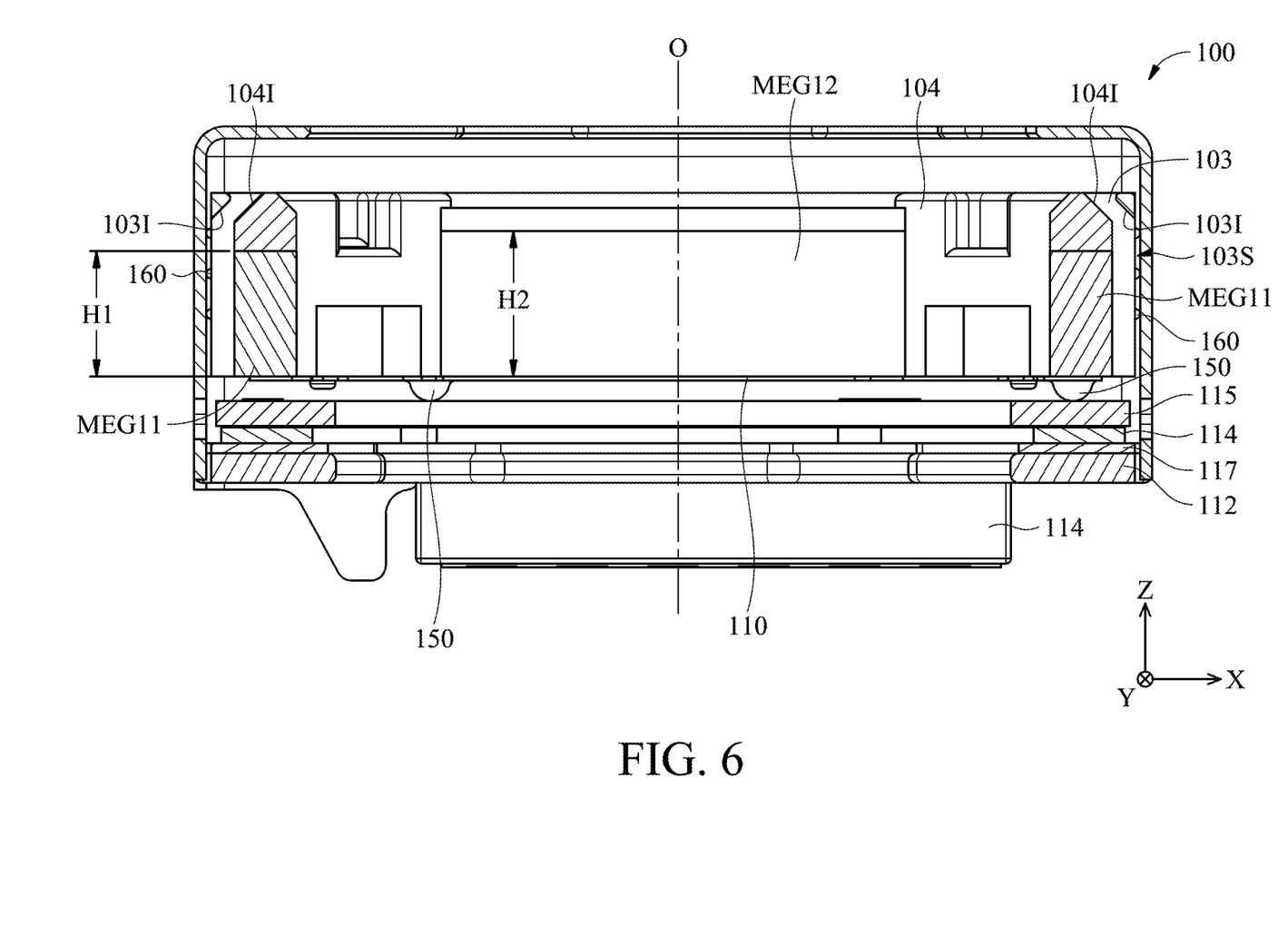
FIG. 6 shows a cross-sectional view of the optical system along line B-B' in FIG. 1 according to the embodiment of the present disclosure.

Please refer to FIG. 6, which shows a cross-sectional view of the optical system 100 along line B-B' in FIG. 1 according to the embodiment of the present disclosure. For the purpose of clarity, only some members of the optical system 100 are shown in FIG. 6. As shown in FIG. 6, the first side 103S of the outer moving frame 103 has an incline stopping structure 103I, and the inner moving frame 104 has an inclined surface 104I corresponding to the incline stopping structure 103I. When the inner moving frame 104 is driven by the electromagnetic driving force to move along the X-axis direction to the rightmost position or the leftmost position, the incline stopping structure 103I is in contact with the inclined surface 104I, so as to constrain the inner moving frame 104 in a limited position along the X-axis direction. For example, the inner moving frame 104 is constrained in a right limited position and a left limited position in FIG. 6.

In addition, in this embodiment, the sizes of the first magnetic elements MEG11 and the adjacent first magnetic elements MEG12 are not equal. For example, as shown in FIG. 6, the first magnetic element MEG11 has a height H1 along the optical axis O, the first magnetic element MEG12 has a height H2 along the optical axis O, and the height H2 is greater than the height. H1. Based on the this structural design, not only the width of the optical system 100 along the X-axis direction can be reduced, but also the inner moving frame 104 can have a large moving range along the X-axis direction.

In addition, in this embodiment, the area of the magnetic conductivity element 117 on the X-Y plane is larger than the moving range of the inner moving frame 104 along the X-axis direction or along the Y-axis direction. That is, when viewed along the optical axis O, the moving range of the first magnetic element MEG11 and the first magnetic element MEG12 does not exceed the area of the magnetic conductivity element 117, and therefore the stability of the driving frame unit during movement can be ensured. In addition, in other embodiments, the driving coil DCL can also be disposed on opposite sides of the optical member holder 108 (not around the optical member holder 108), and faces the two first magnetic elements MEG12. Based on this structural design, the problem of magnetic interference inside the optical system 100 can be addressed.

Figure 7:
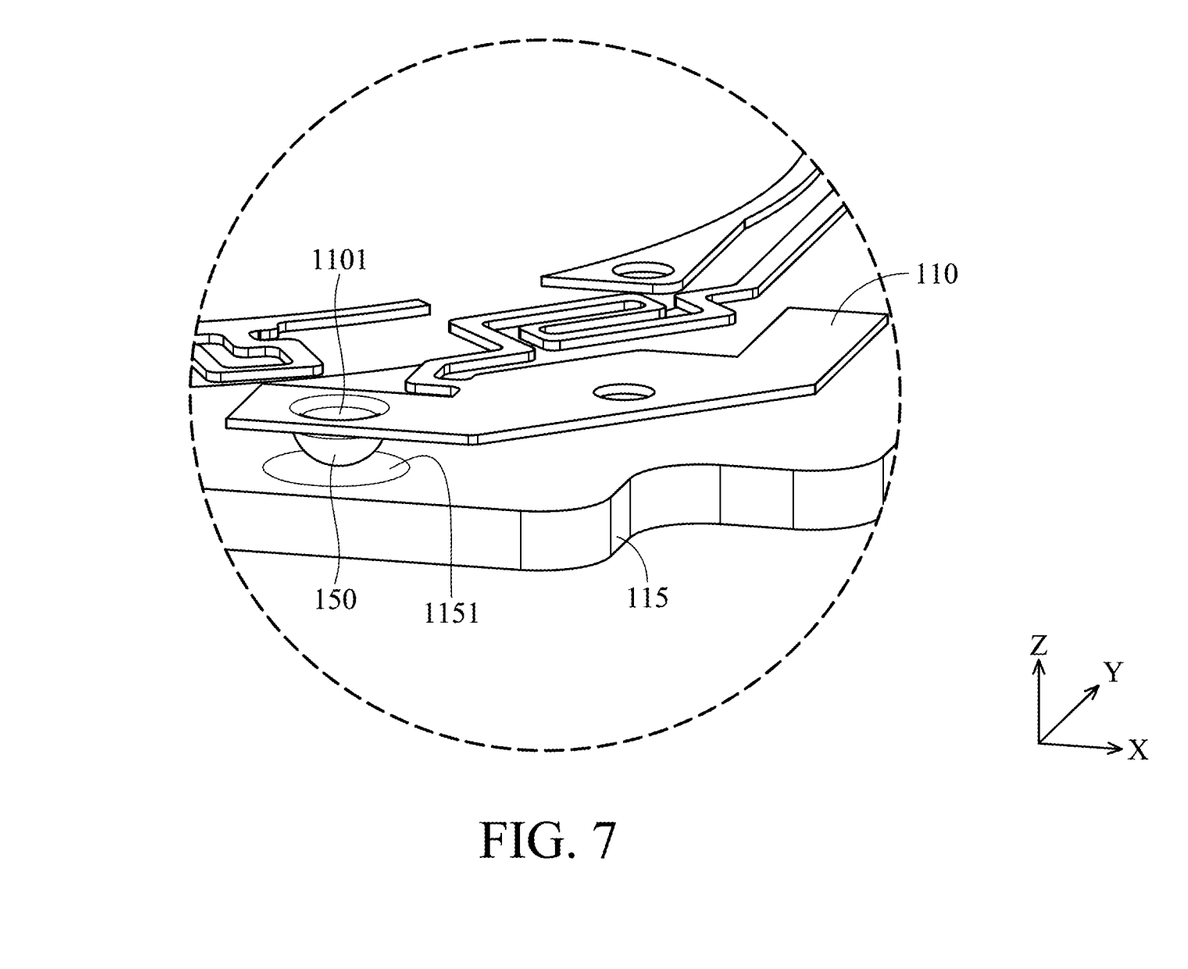
FIG. 7 shows a partial structural diagram of the lower spring sheet and the plate coil according to an embodiment of the present disclosure.

Please refer to FIG. 7, which shows a partial structural diagram of the lower spring sheet 110 and the plate coil 115 according to an embodiment of the present disclosure. As shown in FIG. 7, the sliding member 150 is disposed on the lower spring sheet 110 and is in contact with the electrical contact 1151 on the plate coil 115. It should be noted that because the inner moving frame 104 (FIG. 6) and the lower spring sheet 110 are driven by the electromagnetic driving force to move along the X-axis direction or the Y-axis direction, the sliding member 150 also follows the lower spring sheet 110 to move along the X-axis direction or Y-axis direction. In this embodiment, the size of the electrical contact 1151 is designed to be larger than the sliding range of the sliding member 150, so as to prevent the sliding member 150 from not being continuously electrically connected to the electrical contacts 1151.

In addition, as shown in FIG. 7, a groove 1101 can be formed on the lower spring sheet 110 and disposed on the opposite side of the sliding member 150. In this embodiment, glue may be applied to the groove 1101 so that the lower spring sheet 110 can be securely connected to the inner moving frame 104 in FIG. 3. In addition, in other embodiments, a protruding portion can also be formed on the inner moving frame 104 and is configured to engage with the groove 1101, so that the lower spring sheet 110 can be securely connected to the inner moving frame 104 in FIG. 3. Based on this structural design, the accuracy of assembling the lower spring sheet 110 and the inner moving frame 104 can be increased, and the overall structural strength can also be enhanced.

Figure 8:
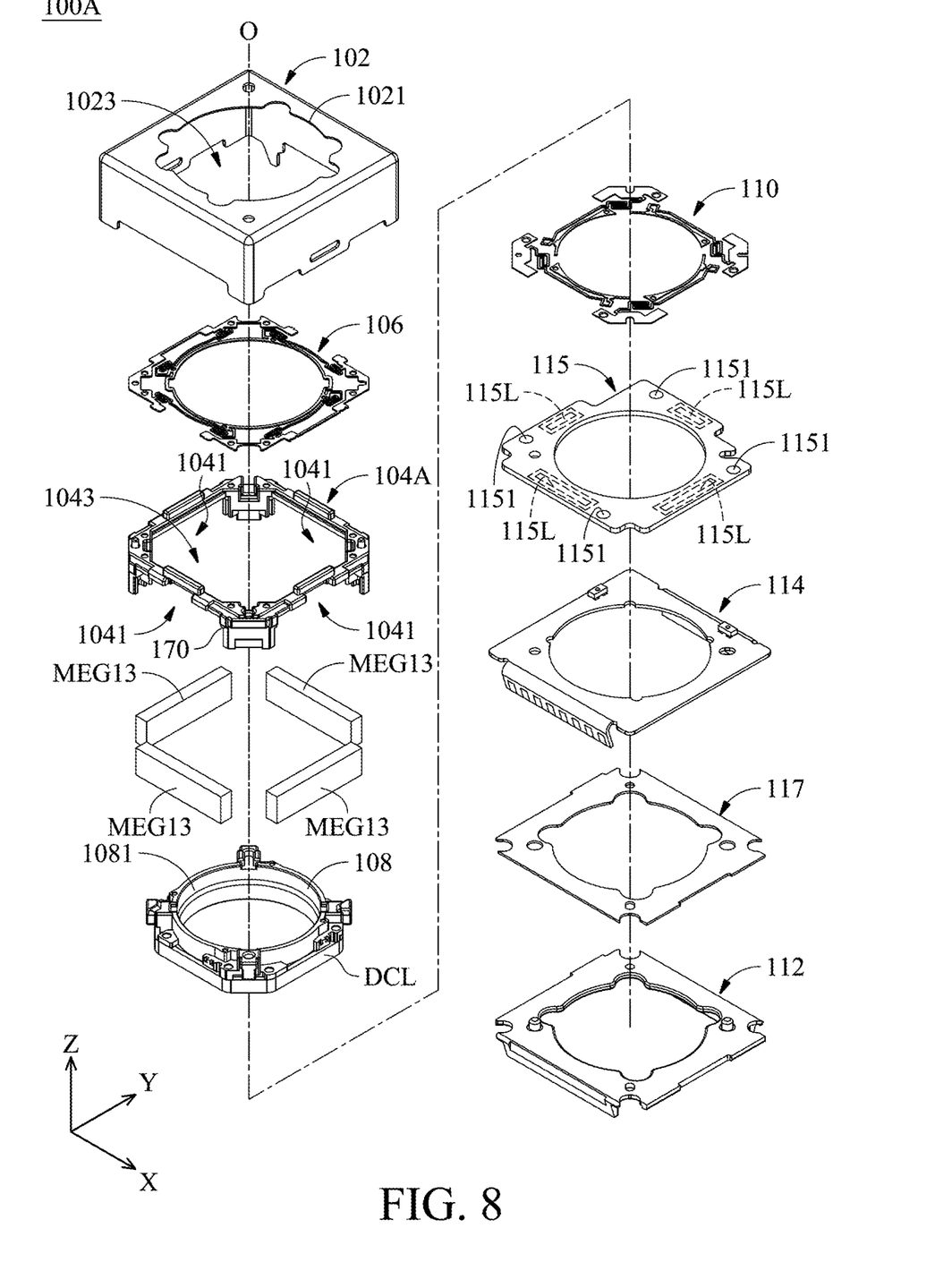
FIG. 8 shows an exploded diagram of an optical system according to another embodiment of the present disclosure.

Please refer to FIG. 8, which shows an exploded diagram of an optical system 100A according to another embodiment of the present disclosure. The structural configuration of this embodiment is similar to that of the previous embodiment, and the difference between the two embodiments is that the optical system 100A only includes one frame 104A and does not include the outer moving frame 103 of the optical system 100. In this embodiment, the four grooves 1041 of the frame 104A are configured to accommodate four magnetic elements MEG13, and the magnetic elements MEG13 have the same size. The four magnetic elements MEG13 correspond to the second magnetic elements 115L in the plate coil 115, and the magnetic elements MEG13 act with the second magnetic elements 115L to generate an electromagnetic driving force, so as to drive the frame 104A and the optical member holder 108 to move relative to the fixed module. In this embodiment, the fixed module can include the plate coil 115, the circuit board 114, the magnetic conductivity element 117 and the base 112.

In addition, similar to the previous embodiment, a magnetic attraction force is generated between the magnetic conductivity element 117 and the four magnetic elements MEG13, so that the movable module (e.g., the frame 104A, the optical member holder 108 and the lower spring sheet 110) is stably disposed on the fixed module. Because the outer moving frame 103 in FIG. 2 is omitted in this embodiment, the size of the optical system 100A can be further reduced, so as to achieve the purpose of miniaturization.

In conclusion, the present disclosure provides an optical system including an optical member holder 108, a driving frame unit, a driving assembly and a base 112. The driving assembly can generate an electromagnetic driving force to drive the driving frame unit with the optical member holder 108 to move relative to the base 112. In some embodiments, the driving frame unit can include an outer moving frame 103 and an inner moving frame 104. The inner moving frame 104 can drive the optical member holder 108 to move relative to the outer moving frame 103 along a second direction, and the outer moving frame 103 can drive the inner moving frame 104 and the optical member holder 108 to move along a first direction.

Based on the structural design of embodiments of the present disclosure, a plurality of elastic members for connecting the upper spring sheet 106 and the fixed module can be omitted, and the problem that the length of the elastic member is too short to be easily damaged can be avoided. Therefore, the optical system of the present disclosure not only can reduce the manufacturing cost, but also can reduce the size of the optical system, so as to achieve purpose of miniaturization.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical system, comprising:
   a fixed module, comprising a base;
   a movable module, comprising:
      an optical member holder, configured to hold an optical member; and
      a driving frame unit, connected to the optical member holder;
   a driving assembly, comprising:
      at least one first magnetic element; and
      at least one second magnetic element, corresponding to the first magnetic element, configured to drive the driving frame unit with the optical member holder to move relative to the base; and
   a plurality of sliding members, securely disposed on the fixed module or the movable module, so that the movable module is able to slide relative to the fixed module;
   wherein the optical system further comprises a circuit unit disposed on the fixed module, wherein at least two of the sliding members are in contact with the circuit unit;
   wherein the driving assembly further comprises a driving coil disposed on the optical member holder, and the driving coil is electrically connected to the circuit unit through the sliding members; and
   wherein the movable module further comprises an elastic member configured to connect the optical member holder and the driving frame unit, wherein the sliding member includes a protruding portion disposed on the elastic member.

2. The optical system as claimed in claim 1, wherein the protruding portion includes a hemispherical structure.

3. The optical system as claimed in claim 1, wherein the circuit unit comprises a plurality of electrical contacts corresponding to the sliding members, a plane is defined by the electrical contacts, and the plane is perpendicular to an optical axis of the optical member.

4. The optical system as claimed in claim 3, wherein a size of each of the electrical contacts is greater than a sliding range of the corresponding sliding member.

5. The optical system as claimed in claim 1, wherein the fixed module further comprises a casing, and the driving frame unit comprises an outer moving frame which is movable along a first direction relative to the casing.

6. The optical system as claimed in claim 1, wherein the movable module, the sliding members and the base are arranged in sequence along an optical axis of the optical member.

7. The optical system as claimed in claim 1, wherein the fixed module further comprises a magnetic conductivity element, the first magnetic element is disposed on the driving frame unit, and the first magnetic element is configured to act with the magnetic conductivity element to generate a magnetic attraction force.

8. An optical system, comprising:
   a fixed module, comprising a base;
   a movable module, comprising:
      an optical member holder, configured to hold an optical member; and
      a driving frame unit, connected to the optical member holder;
   a driving assembly, comprising:
      at least one first magnetic element; and
      at least one second magnetic element, corresponding to the first magnetic element, configured to drive the driving frame unit with the optical member holder to move relative to the base; and
   a plurality of sliding members, securely disposed on the fixed module or the movable module, so that the movable module is able to slide relative to the fixed module;
   wherein the fixed module further comprises a casing, and the driving frame unit comprises an outer moving frame which is movable along a first direction relative to the casing,
   wherein the driving frame unit further comprises an inner moving frame which is movable along a second direction relative to the outer moving frame, wherein the first direction is different from the second direction.

9. The optical system as claimed in claim 8, wherein the sliding members are respectively disposed on a first side of the outer moving frame and a second side of the inner moving frame, and the first side is not parallel to the second side.

10. The optical system as claimed in claim 9, wherein the optical system further comprises a circuit unit disposed on the fixed module, the driving assembly further comprises a driving coil, and the movable module further comprises an elastic member;
    wherein the circuit unit is electrically connected to the driving coil through the casing, the sliding members, the outer moving frame, the inner moving frame and the elastic member.

11. The optical system as claimed in claim 8, wherein the movable module further comprises an elastic member configured to connect the optical member holder and the driving frame unit, the sliding member is disposed on the elastic member, and a groove is formed on the elastic member and is disposed on an opposite side of the sliding member.

12. The optical system as claimed in claim 11, wherein a protruding portion corresponding to the groove is formed on the inner moving frame, and the protruding portion is configured to engage with the groove.

13. An optical system, comprising:
    a fixed module, comprising a base;
    a movable module, comprising:
       an optical member holder, configured to hold an optical member; and
       a driving frame unit, connected to the optical member holder;
    a driving assembly, comprising:
       at least one first magnetic element; and
       at least one second magnetic element, corresponding to the first magnetic element, configured to drive the driving frame unit with the optical member holder to move relative to the base; and
    a plurality of sliding members, securely disposed on the fixed module or the movable module, so that the movable module is able to slide relative to the fixed module;
    wherein the driving assembly comprises a plurality of first magnetic elements disposed on the driving frame unit, and sizes of two adjacent magnetic elements are different.

14. The optical system as claimed in claim 13, wherein the two adjacent first magnetic elements are not equal in height along the optical axis of the optical member.

\* \* \* \* \*